US006182085B1

United States Patent
Eichstaedt et al.

(10) Patent No.: US 6,182,085 B1
(45) Date of Patent: Jan. 30, 2001

(54) COLLABORATIVE TEAM CRAWLING:LARGE SCALE INFORMATION GATHERING OVER THE INTERNET

(75) Inventors: Matthias Eichstaedt, San Jose; Daniel Alexander Ford; Tobin Jon Lehman, both of Los Gatos; Qi Lu, San Jose, all of CA (US); Shang-Hua Teng, Champaign, IL (US)

(73) Assignee: International Business Machines Corporation, Armonk, NY (US)

( * ) Notice: Under 35 U.S.C. 154(b), the term of this patent shall be extended for 0 days.

(21) Appl. No.: 09/086,379

(22) Filed: May 28, 1998

(51) Int. Cl.[7] .................................................. G06F 17/30

(52) U.S. Cl. ..................... 707/104; 707/102; 345/440; 709/105; 709/201

(58) Field of Search ................................. 707/103, 102, 707/104; 345/441, 501, 440; 709/201, 105

(56) References Cited

U.S. PATENT DOCUMENTS

| | | | |
|---|---|---|---|
| 5,546,517 | * 8/1996 | Marks et al. | 395/145 |
| 5,706,503 | * 1/1998 | Poppen et al. | 395/611 |
| 5,774,660 | * 6/1998 | Brendel et al. | 395/200.31 |
| 5,963,208 | * 10/1999 | Dolan et al. | 345/357 |

OTHER PUBLICATIONS

Nihar R. Mahapatra and Shantanu Dutt, "Scalable Global and Local Hashing Strategies for Duplicate Pruning in Parallel A* Graph Search", IEEE Transactions On Parallel And Distributed Systems, vol. 8, No. 7, pp. 738–756, Jul. 1997.*

Thomas E. Anderson, Edward D. Lazowska, and Henry M. Levy, "The Performance Implications of Thread Management Alternatives for Shared–Memory Multiprocessors", Performance Evaluation Review vol. 17, ACM, pp. 49–60, Jul. 1997.*

* cited by examiner

Primary Examiner—John E. Breene
Assistant Examiner—Cheryl Lewis
(74) Attorney, Agent, or Firm—Khanh O. Tran, Esq.

(57) ABSTRACT

A distributed collection of web-crawlers to gather information over a large portion of the cyberspace. These crawlers share the overall crawling through a cyberspace partition scheme. They also collaborate with each other through load balancing to maximally utilize the computing resources of each of the crawlers. The invention takes advantage of the hierarchical nature of the cyberspace namespace and uses the syntactic components of the URL structure as the main vehicle for dividing and assigning crawling workload to individual crawler. The partition scheme is completely distributed in which each crawler makes the partitioning decision based on its own crawling status and a globally replicated partition tree data structure.

43 Claims, 10 Drawing Sheets

COLLABORATIVE TEAM CRAWLING:LARGE SCALE INFORMATION GATHERING OVER THE INTERNET

BACKGROUND OF THE INVENTION

1. Field of the Invention

The present invention relates to a scalable method for collaborative web crawling and information processing. More particularly, the invention concerns a distributed collection of web crawlers used to cover a large portion of cyberspace where the crawlers share the overall cyberspace crawling and collaborate to maximally utilize computing resources.

2. Description of the Related Art

Cyberspace is a popular way for people and industries to rapidly gather information. However, because of the immense amount of information available in cyberspace, automatic information gathering, screening, and delivering systems have become a necessity.

One such system is the Grand Central Station (GCS) system being developed at the IBM Almaden Research Center in San Jose, Calif. This system combines numerous aspects of information discovery and dissemination into a single, convenient system. GCS performs many functions by providing an infrastructure that supports the discovery and tracking of information in a digital domain such as cyberspace, and disseminates these discoveries to those who have an interest.

One of the key components of virtually all information discovery system infrastructures accessing cyberspace (i.e. the Internet) is a Gatherer that systematically gathers data sources (crawls) and transforms or summarizes them into a single, uniform, metadata format. This format generally reflects the format found in the system used by the person requesting the information. Webcasting technology referred to as an "Internet push" is used to match the summarized information with users' profiles and re-channel each piece of information to those who need it.

To assist in gathering information, cyberspace data located at a particular site being reviewed is logically arranged into a graph or tree, commonly referred to as a directed graph. The Gatherer traverses this web-graph looking for desired information. Because of the sheer volume of data available, the graph reviewed might be very large in size. For example, a directed graph representing one million pieces of potentially interesting information would be enormous in size and complexity. A large graph would require a considerable amount of time for the Gatherer to process the information.

To make a Gatherer more efficient, a system that allows partitioning of a web-space directed graph is needed. Preferably, the system would also allow "team-crawling," where web-space information could be gathered using multiple processors assigned to crawling parts of the same space. However, for such a partitioning to work, problems encountered with automatically partitioning the cyberspace for load balancing among gathering processors needs to be overcome. This is a different and much more challenging problem than discussed in current traditional graph partitioning problem studies dealing with very large scale integrated (VLSI) circuit design and parallel scientific computing.

For example, one difficulty comes from the fact that a web-space directed graph, used to model the information at the site, is usually not discoverable before the crawling occurs. This is because web sites are dynamic, that is, they are always changing, having information added and deleted up to the point the crawling actually takes place. This constant changing of the information—and therefore the directed graph used to model the information—prevents directly applying the previously mentioned graph partitioning methods that are designed for static (non-changing) graphs. This lack of full knowledge of a web-graph construct before a web space is partitioned also requires the amount of load and the number of hyperlinks across a partition to be changeable at any stage of collaborative crawling, and hence dynamic re-partitioning and load re-balancing would also be necessary.

Another problem that would need to be overcome is the addressing problem that arises in attempting to partition a web-space. For example, given a uniform resource locator (URL)—a commonly used designator for the location of a piece of information (object)—a quick decision needs to be made as to which partition it would belong. Depending upon the partition, it would then be sent to a designated processor for crawling and processing. Further, because the web-graph is dynamic, a problem can arise in simply organizing a partition.

SUMMARY OF THE INVENTION

Broadly, the present invention concerns a method using multiple processors for collaborative web crawling and information processing. More particularly, the invention concerns a distributed collection of web crawlers, each of which is used to cover a logical partition created within a cyberspace, where the crawlers share the overall cyberspace crawling and collaborate to maximize the use of available computing resources.

In one embodiment, the invention may be implemented to provide a method to dynamically partition a cyberspace and load balance crawling of the space across one or more Gatherers used by the web-crawling system. One such version includes using a hierarchial structure of URL names—an intermediate structure called a superpage—used as a basic unit for top level partitioning, where a superpage is a collection of URLs that share some initial sub-sequence of their URL names.

For example, for a URL such as "cs.cmu.edu/groups/parallel/parallel.html"—a specification of a path in a tree—may be viewed as a sequence of tokens (edu, cmu, cs, groups, parallel, parallel.html.) In this embodiment, a superpage whose initial tokens form "cs.cmu.edu/groups/parallel" can be formed, and another superpage whose initial tokens form "math.cmu.edu" may be formed. In one embodiment, this set of superpages may be formed dynamically during the crawling to accommodate any new information. By partitioning and re-partitioning superpages, the method dynamically balances a processing load incurred in information gathering.

The methods of the current invention implement an explicitly structured web-graph where every URL belongs to a superpage. Each superpage may contain pages that are reasonably local to each other, both in physical addresses and in hyperlink connections. If this web-graph is applied onto a set of superpages that are created dynamically, a smaller "coarsened" image of the original web-graph is obtained where this coarsened image approximates the larger web-graph.

In this invention, superpages may be automatically recognized and generated. Necessary information is obtained and maintained to measure the "volumes" of superpages as well as any pattern of connections among superpages. In another embodiment, an access rate for each processor to these superpages is maintained to determine if different processors have different access rates to each superpage. For example, a crawler located at IBM-Almaden in the United States may have a longer access time to a server located in Japan than a crawler located in Japan.

Once a set of superpages is formed and processor statistical data is obtained, the method employs a partitioning method to automatically generate favored partitions for the superpages, and maps them among available processors. The current invention can be used when all information crawlers/gatherers are located on a single, tightly coupled high-performance system as well as when they are scattered in any distributed environment.

The method allows the processors to communicate with each other to coordinate and handle hyperlinks across a partition. A communication buffer—referred to in this application as "Tspaces"—is used to support fast and inter-process communication. Logically, a Tspaces can be viewed as a large "white-board", or global communication buffer accessible by all processors. This function is described, for example, in IBM TSPACES, Peter Wyckoff, et al, IBM Sys. Journal, August 1998 to appear.

In another embodiment, the invention may be implemented to provide a digital signal processing system used to implement the method aspects of the present invention. In one embodiment, this system may include a plurality of processors located at one or more locations communicatively connected to storage. The system may also be communicatively linked to cyberspace, that is, to an information (object) intensive database. In other embodiments, and as discussed further in the detailed description and in relation to the drawings, other hardware commonly found in information gathering and processing systems may be included in the various system embodiments contemplated by the present invention.

In still another embodiment, the invention may be implemented to provide an article of manufacture comprising a data storage device tangibly embodying a program of machine-readable instructions executable by a digital data processing system to perform method steps for collaborative web crawling and information processing.

The invention affords its users with a number of distinct advantages. One advantage is that the invention provides for the design of an efficient and dynamic partitioner for handling a large dynamic web-graph. Another advantage is that a trade-off between hyperlink locality and network locality in dynamic load balancing may be explored and used to maximize system efficiencies.

Yet another benefit is that the present invention optimizes mapping between a web-subdomain and gathering processors that might have different processing and communication capacities. Another benefit is that when the size of a gathering process exceeds the size of available memory, a trade-off between introducing redundant computation and accurate computation may be studied and implemented. One more advantage is that the invention develops an efficient scheme to determine what fraction of a web-graph that has already been explored.

The present invention also provides a number of other advantages and benefits, which should be apparent from the following description of the invention.

BRIEF DESCRIPTION OF THE DRAWING

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS OPERATION

Figure 1:
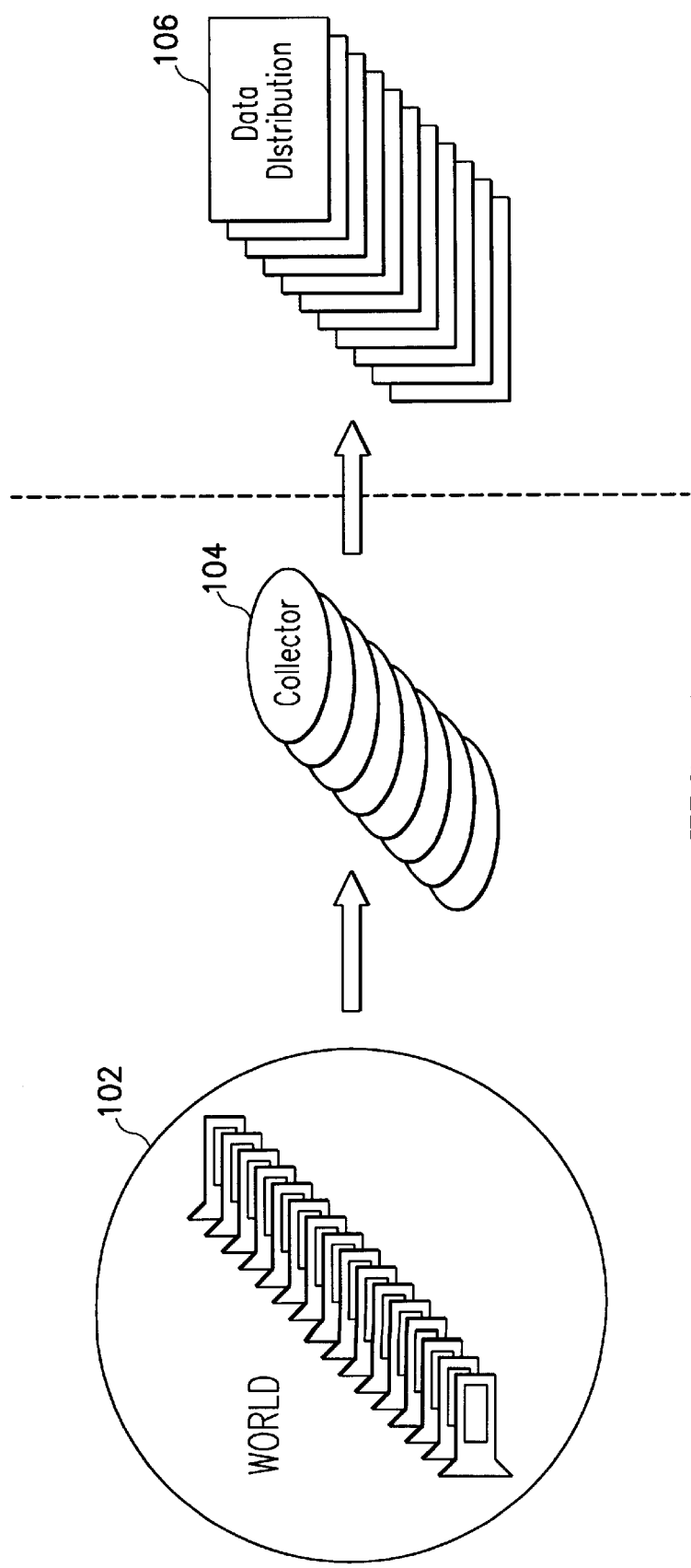
FIG. 1 is a flowchart showing the general environment and application of the present invention.

One aspect of the invention concerns a method for collaborative information gathering in a digital domain such as an intranet or an Internet. Generally, gathering as shown in FIG. 1 retrieves objects and commands stored throughout a linked net such as a World 102, collects the information using a collection method executed by a collector such as Collector 104, and distributes the objects and commands to users who have requested the information, represented by Data Distribution 106.

Figure 2:
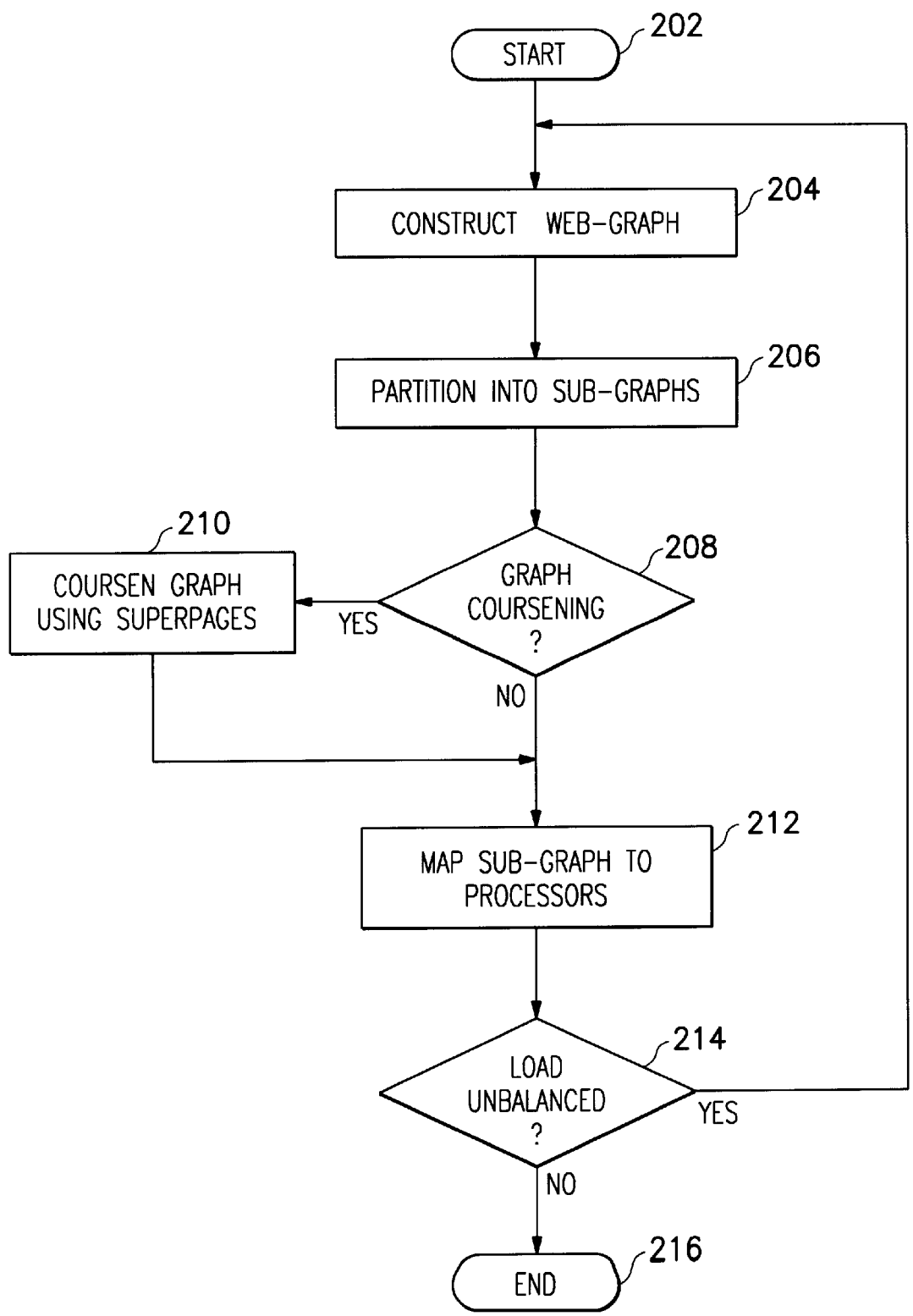
FIG. 2 is a flowchart of an operational sequence for one method of the present invention for gathering information from an information system.

One embodiment of one method performed during gathering, also referred to as collaborative crawling or team crawling throughout this application, is shown in FIG. 2. The method begins in task 202 and a web-graph is constructed in task 204. This web-graph is a hierarchial logical structure representing various relationships between information contained within the graph. This information is defined by the scope of the search requested. The web-graph may be partitioned into sub-graphs in task 206 for various reasons, such as to provide expedited processing of information. Graph "coarsening" may be implemented in task 208 as discussed below and superpages may be used in task 210 as required. After a web-graph has been completed, these sub-graphs are mapped to respective processors in task 212. Generally, the processor to which a sub-graph is mapped is the processor providing the fastest processing time. If the processing load becomes unbalanced in task 214, for example, if a sub-graph is added during execution of the method, repartitioning may occur to rebalance the processing load. Otherwise, the processing continues until the method ends in task 216.

A fuller discussion regarding gatherers, web-graphs, collaborative crawling, partitioning and graph coarsening, mapping, and load balancing follows.

A. Gatherers

A Gatherer, used in the present invention, operates similarly to an expanded web crawler. Based on its configuration, the Gatherer periodically crawls a list of data sources such as web servers, news servers, file directories, and databases. The crawling follows the information organization structure of the corresponding data source such as HTML hyper-links, news group structure, file system hierarchy, and database schemes. For each encountered object such as an HTML page, a news article, a file or a database table, the Gatherer first retrieves the object from the data source and creates a summary for it. This summary data is represented using a summary or absract format which is simply a list of attribute name and attribute value pairs where the attribute value can be any arbitrary value.

Figure 3:
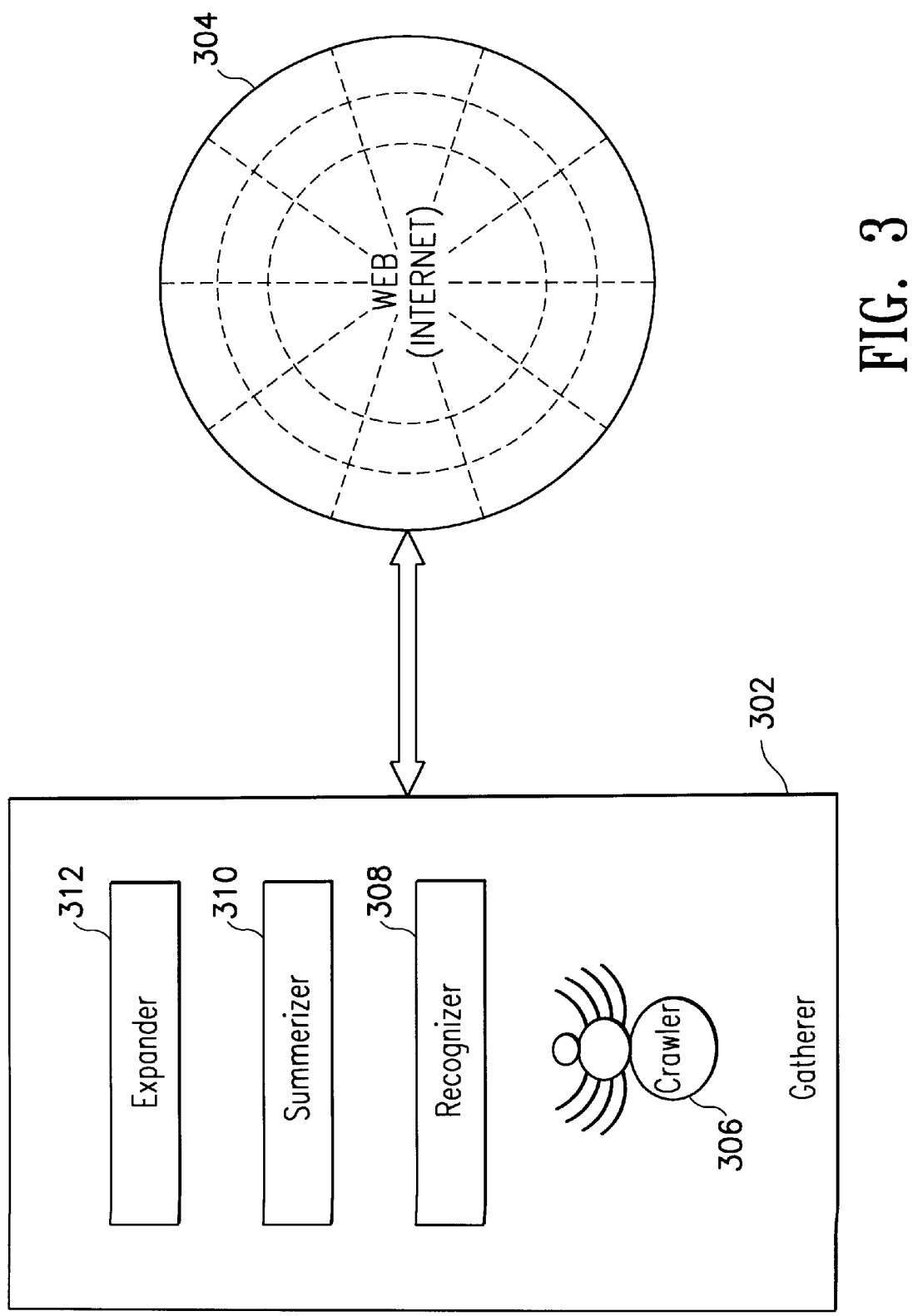
FIG. 3 is a block diagram of one embodiment of a gatherer as used in one embodiment of the present invention.

One example of a Gatherer 302 communicatively linked to a web 304 is pictured in FIG. 3 and has a number of components. The web 304 may comprise an Internet, an intranet, or a single information source including media or multimedia objects. The Gatherer 302 may include a Crawler 306 component that crawls media sources and retrieves objects while a Recognizer 308 component tries to determine the format for each of the retrieved objects. A Summarizer 310 component contains specialized codes that enable it to read a great number of different object formats such as a Freelance graphics presentation, an HTML page, a Lotus Notes database, or an Excel spreadsheet. It also provides a flexible structure for plugging in customized summarization codes to be used for summarizing data from a specific location. Compressed files included in a ZIP, TAR or JAR file are first extracted out by an Expander 312 component and then processed by the Summarizer 310. A Gatherer may also carry an embedded HTTP server (not shown) so that system administrators can use a web-browser to control its operations and monitor its status.

One example of a method that may be performed by a Gatherer follows:

Method Cyberspace Crawling

Starting from a collection of source URLs (e.g., www.ibm.com), perform a breadth first search (BFS) search out of the hyperlink;

When encountering a new page, build a summary for the page (Parts of information kept in a summary page that are important to the crawling method include a URL of a parent on the BFS-tree and all hyperlinks out of the page); and Maintain a queue of the set of pages whose parents are found. (The Gather may also maintains a hashtable of the set of URLs that have been summarized. If a URL referred by a hyperlink out of the current page has been processed, then it will not be put back into the queue.)

In short, the Gatherer performs BFS on a large web-graph whose structure is not given explicitly in advance.

B. The Web-graph

As mentioned in the Background of the Related Art section, a static web-graph may be used in current information gathering systems. However, these types of static graphs do not work for optimizing the present invention for numerous reasons.

First, a web-graph is not known (explicitly) to the present invention's partitioner in advance. In addition, the web-graph may be very large and fast growing dynamically. In the process of crawling, more and more of this unknown graph may be explored, allowing additional information to be added to the web-graph. Therefore, the present invention includes dynamic load balancing and load rebalancing as necessary.

Second, the web-graph used for implementing the present invention may be highly irregular. The web-graph may include multiple local expander sub-graphs and internal vertices that have very large "in" and "out" degrees, that is, a large number of links to and from the vertices. There may also be a lot of local sub-hierarchial structures that are highly connected with URLs leading outside the information defined by the web-graph. Therefore, the present invention includes, in various embodiments, methods for handling classes of sub-graphs before actual partitioning of a web-graph occurs.

Third, the web-graph is a directed graph, making it difficult to know the in-degree of each page. Moreover, web-pages are usually restricted to read-only status. This requires the present invention to coordinate among processors to check whether a page has been visited, or whether a visit is necessary.

Fourth, and primarily affecting the system embodiments of the present invention discussed below, the systems hyper-link connections (locality) are very different from its network connections (locality). If gatherers/crawlers are located at different network sites, then partitioning the web-graph for achieving both hyperlink locality and network locality is also performed in one embodiment of the present invention.

C. Overall Sequence of Operation (Collaborative Crawling)

The distributed environment of the present invention requires the use of more than one gatherer/crawler. These gatherers may be organized to collaboratively explore a web-space, to generate summaries, and to store these summaries for future reference. In order to achieve the maximum efficiency in collaboration of "team" crawling, these gatherers/crawlers are coordinated so that the load is balanced and computational overhead is minimized. Coordination is achieved by partitioning a web-space (the URL space) into sub-spaces and assigning each sub-space to a processor. Each processor is responsible to build summaries for those URLs contained within its assigned sub-space. During the construction of a summary, new URLs may be added to the web-space. In this event, a processor will keep processing those URLs belonging to its sub-space, including the new URL if appropriate, and route other URLs to proper processors.

Because of this cross-coordination of processors, the present invention includes a method that allows the processors to communicate with each other. There are two types of information needed for the communication in team crawling: foreign URLs, where a processor needs to send a URL given by a crossing hyperlink to the processor assigned to it; and coordination signals, used to remap and load rebalance the system.

Figure 4:
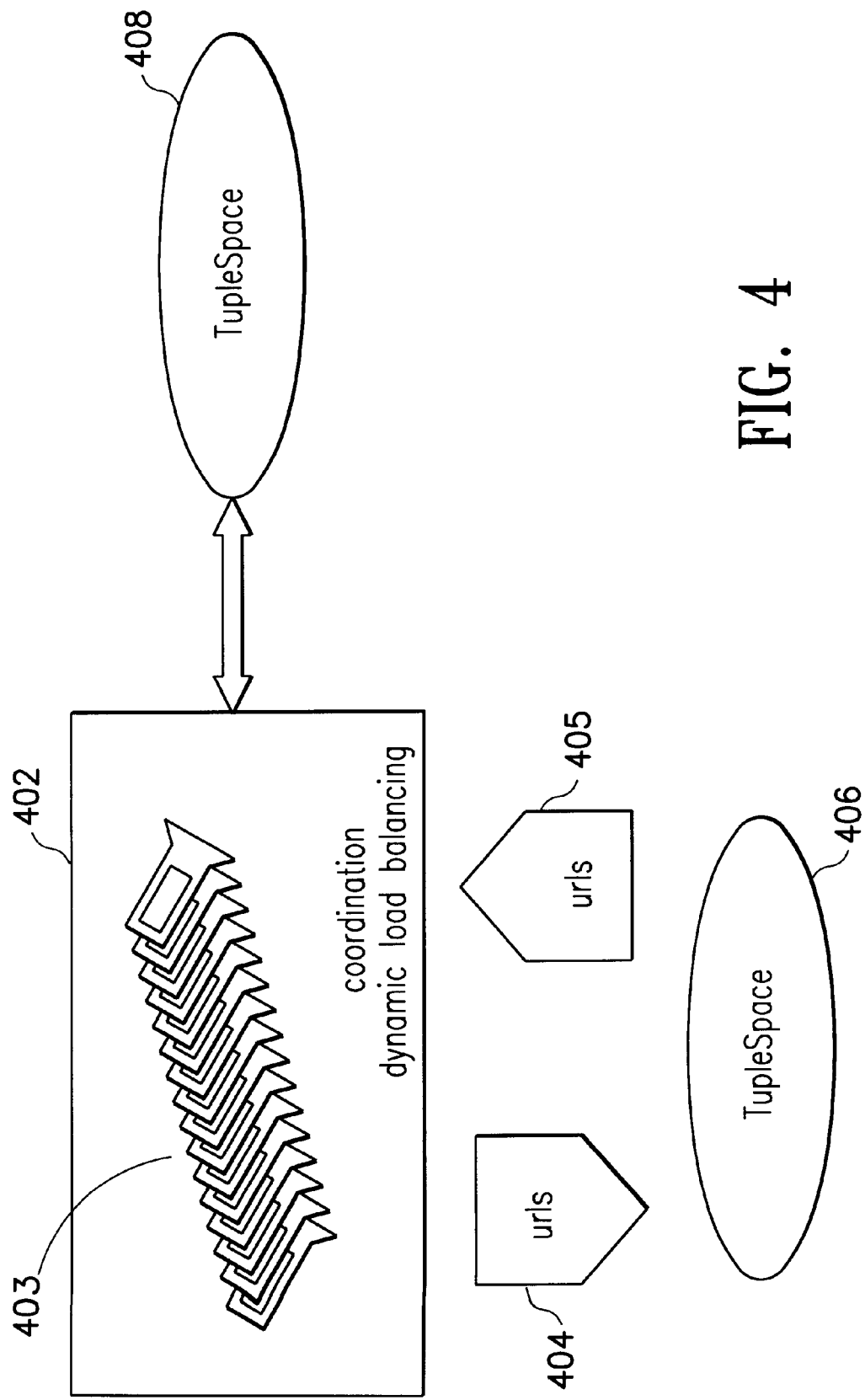
FIG. 4 is a flow diagram illustrating collaborative team crawling and the use of a Tspaces in accordance with one embodiment of the present invention.

In one embodiment, the present invention uses Tspaces for processors to support both foreign URLs and coordination signals, where a Tspaces is a shared location that can be thought of as a shared white-board among processors. In another embodiment, the invention implements a processor-to-processor communication method to support the communication of foreign URLs, and only uses Tspaces to exchange coordination signals. For example, FIG. 4 shows a high-level description of one embodiment of the present invention's team crawling architecture where a bevy of processors 403 are logically shown in a location 402. Objects identified by URLs have been divided and assigned to respective processors. A to-be-assigned URL space 404, received into location 402 during collaborative crawling, may be moved to Tspaces 406 for assignment to a respective processor. Likewise, an assigned URL space 405 may be moved from the Tspaces 406 to a processor 403 after assignment. A Tspaces 408, logically shown separate from Tspaces 406—although it may not be physically separate—are used for coordination among processor for load rebalancing.

D. Tspaces

In the present invention, a Tspaces is used in one embodiment for inter-processor communication and coordination. The Tspaces space, which may be used in conjunction with a parallel programming language, embodies the following principles:

Anonymous communication;

Universal associative addressing; and

Asynchronous Communication

Persistent data.

In a Tspaces, unstructured tuples may be posted to a Tspaces; tuples may be used or removed from a Tspaces; and tuples may be read from a Tspaces.

A Tspaces may be used in a general embodiment for logically connecting the distributed components of the present inventions system. In another embodiment, Tspaces may also be used to coordinate processors in collaborative crawling.

E. Partitioning

A URL-space such as that logically used in the present invention is a large directed graph called a web-graph, where a directed graph is a collection of vertices and directed edges (ordered pairs of nodes) connecting these vertices. In the web-graph, each URL defines a vertex. A URL is directly connected with another URL if the second one is linked to the page defined by the first one.

In collaborative crawling, this web-graph (or URL-space) is divided into sub-graphs (sub-URL-spaces) that are mapped among processors that are available for performing processing functions.

For example, if a web-graph W=(U,L), where U is a set of all interesting URLs in and L is a set of hyperlinks among URLs, a k-way partition of W is the division of U into k subsets represented by $U_1, U_2, \ldots, U_k$, where L denotes a set of crossing links from $U_i$ to $U_j$.

If a system has k processors and $U_i$ is mapped onto the ith processor, the processor i needs to examine $|U_i|$ URLs and send $|L_{ij}|$ links to processors during crawling where $|U_i|$ and $|L_{ij}|$ are the cardinality of sets $U_i$ and $L_{ij}$. This communication of links from one processor to another is one kind of overhead in collaborative team crawling.

To maximize efficiency, there are several load balancing measures that the present invention may optimize:

Work balance: with respect to a partition $U_1, \ldots, U_k$, the amount of work that processor i needs to perform may be measured by the total time that processor i spends on retrieving pages from $U_i$, on generating summaries of these pages, and on processing new links from these pages.

In team crawling, different processors may have different machine speed, and depending on the site of the machine and the site of the server of the URL-pages, the accessing time of the pages will be different from processors to processors, and from URLs to URLs.

Space balance: with respect to a partition, the amount of disk space (memory space) needed by processor i is roughly proportional to the total size of SOIFs that processor i needs to build;

Minimize crossing links: when a processor finds a page that is not in its partition, it may pass the information to a processor that is responsible, that is, to the processor responsible for processing information in that partition.

Optimizing one or more of the above—matching processors and URLs to load balance and reduce processing overhead—is a major advantage of the present invention.

F. Partitioning a Web-Space

The web-space partitioning method used by one embodiment is dynamic. Because a web-space is large and dynamically changing and its structure is not known in advance, the partitioning method generates a mapping of the web-space automatically. In addition, because of the dynamic nature of the processing load and, potentially, the number of available Gatherer processors, the method adjusts to achieve the best performance during a given run-time.

The dynamic web-space partitioning method may also automatically form sub-domains that are spatially close, allowing each processor to map to a sub-domain to which it has the most efficient access. The method may also automatically form sub-domains that have more internal hyperlinks so that the amount of communication overhead in parallel crawling is reduced, and minimize the computation overhead of a processor that is responsible for a given URL.

To minimize computation overhead, such as that experienced by mapping, the present invention includes a partition scheme in one embodiment that does not use a semantic content of an URL-page, i.e., a scheme that only uses information given in the URL name itself. Because crawling is an I/O intensive computation, it is expensive to decide which processor should examine a URL page by first fetching the page.

1. Coarsening for a manageable structure over the web-graph

To cope with large scale and dynamically changing web-graphs, and to reduce computation overhead, one version of the invention uses "graph coarsening" for partitioning a web-graph.

The basic idea of graph coarsening is that given a graph G=(V,E), a coarsened image G'=(V',E') of G is created by vertex-contraction. In other words, each vertex in V' corresponds to a subset of vertices in V, where a vertex of G' is a "supernode" of G. Similarly, each edge of E' corresponds to a collection of edges in G. Once the coarsened G' is created, G' can be partitioned and mapped back to G. In general, a good coarsened graph retains the locality of the original graph so that a good partition of G' approximates a good partition of G. One advantage of the coarsening based partitioning is a reduction of the complexity of the web-graph because G' tends to be much smaller than G.

Whether or not graph coarsening is implemented, there are a minimum of two types of localities that need to be optimized to reduce overhead. In some applications, graph coarsening can help optimize these localities.

a. Physical locality

The physical locality of a processor processing partition information, characteristically defined by the network graph, needs to be mapped to a sub-space where it can work most efficiently. To achieve this, URLs are clustered based on how close they are to each other in the network space. For example, all URLs from a server may be placed into a same sub-domain in the partition. This clustering by network space location is necessary because a domain name itself does not directly give any us the information of physical closeness. Nor is the Internet provider (IP) address of the URL domain name helpful in defining physical location. For example, in a domain called ibm.com, a tokyo.ibm.com sub-domain may be physically far away from a sub-domain named almaden.ibm.com. In comparison, a sub-domain of xerox.com, may be parc.xerox.com is much closer to almaden.ibm.com in the network. On the other hand, gcs.alamada.ibm.com and help desk.alamden.ibm.com may be very close in their network. Thus, proper expansion of the URL's domain name hierarchy will gradually provide blocks of servers whose sites are close physically.

b. Another way to optimize team crawling, other than balancing the search load, is to optimize hyperlink (link) locality, as defined by the web-graph, so that the partitioning reduces the amount of crossing links among processors. Because of limited space in Tspaces, or any other communication mechanism used, optimization of link locality reduces the number of tuples transferred to the Tspaces, saving this iteration. In addition, the more tuples on Tspaces, the less efficient the Tspaces will be, creating a communication bottleneck. For example, the queue for Tspaces caused in a BFS search can be very large.

The present invention applies in one embodiment coarsening based partitioning for dynamic load balancing over a web-graph. This coarsening introduces a manageable structure over the web-graph, retaining as much locality as possible.

Reducing a web-graph to a manageable structure is necessary because the web-graph is not explicitly given to the partitioner in advance. The coarsening method dynamically forms good supernodes, also referred to as superpages, and the contracted graph defined by these superpages. A URL name hierarchy is used to define superpages to optimize localities and identification between URLs and superpages. The creation of a superpage uses information collected during the gathering phase to dynamically recognize which superpage should be formed for the next phase load rebalancing. Partitioning divides the coarsened web-graph defined by these dynamically created superpages and generates a mapping between processors and superpages to further optimize localities.

2. URL name hierarchy

Figure 5:
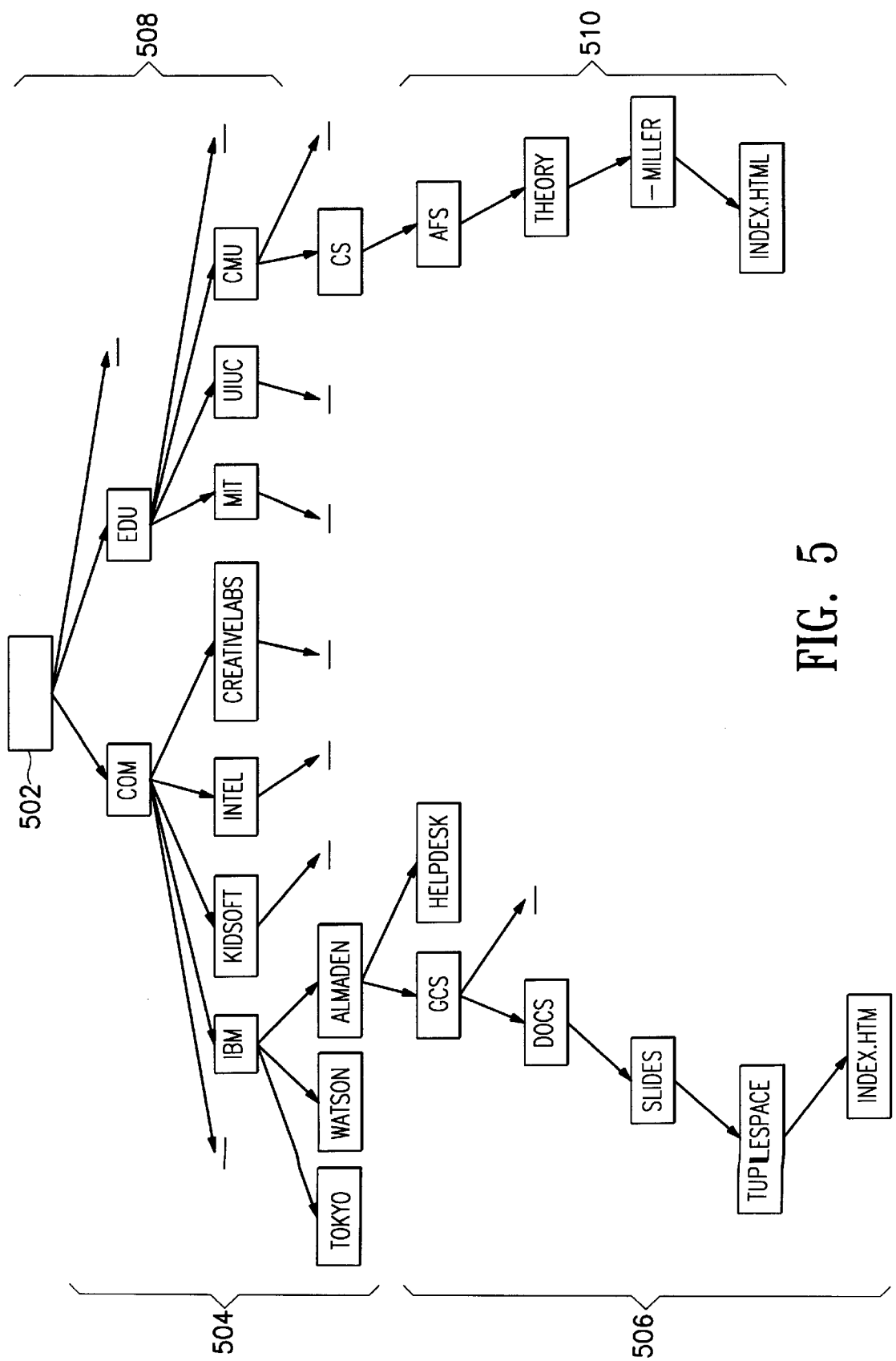
FIG. 5 is an illustration of a URL-tree in accordance with one embodiment of the present invention.

A URL usually contains the following information: host domain name (e.g., almaden.ibm.com), protocols (e.g., ftp), port (e.g., 1080), user ID, uid (e.g., steng), password (e.g., ******), and URI, that is, the directory under a server, (e.g.,/docs/Slides/Tspaces/index.htm). In the present invention, the host domain name and URI are used to define superpages as defined below. There is a natural hierarchical structure over URL names, generally referred to as a URL-hierarchy or a URL-tree. FIG. 5 shows a part of a hierarchal tree defined by URL names.

This first part of a URL name 504 shown in FIG. 5 is its Internet host domain name. It is a hierarchical naming scheme where a name consists of a sequence of sub-names separated by a delimiter character, the period. Each section in the domain name is referred to herein as a token. For example, com, ibm, and tokyo would be tokens of the domain name tokyo.ibm.com. A "top level" token of a domain name space looks like the following:

COM (Commercial Organization)
EDU (Education Institutions)
GOV (Government Institutions)
MIL (Military Groups)
NET (Major network support centers)
ORG (Organizations other than those above)
ARPA (Temporary ARPANET domain)
country code (Countries other than USA)

A domain name could be the name of a machine, of a sub-domain, or even of a user. The full domain name of a URL determines its Internet physical address. In general, there is a certain block structure (locality structure) relating domain names and IP addresses. For example, almost all servers in a sub-domain cmu.edu. shown in FIG. 5 are closely located in Pittsburgh, Pennsylvania.

Further, all Internet domain names are associated with servers and are arranged in a tree structure that corresponds to the naming hierarchy. This hierarchy demarks sub-domains in the invention's environment, and defines a top section of our URL-hierarchy. The URI also defines a hierarchy. So the URL-tree is formed by the domain name hierarchy followed by the URI hierarchy, where each URI is associated with a leaf in the URL-tree.

In FIG. 5, a representative URL 502—shown as a blank box—comprises a host domain name and a directory with a server situated at the domain location. In one case, the URL 502 may comprise a host name 504 of tokyo.ibm.com and a directory 506 of gcs.docs.slides.Tspaces.index.htm. A different URL may comprise a domain 508 comprising cmu.edu and a directory 510 comprising cs.afs.theory.~miller.index.html. Depending upon the information desired, the URL 502 may take on any respective domain name and directory.

3. Superpage

Assuming that one version of the present invention has k "gatherers" or processors, the web-graph is divided into k sub-graphs $W_1, \ldots W_k$. Each sub-graph is mapped to a processor (e.g., $W_i$ to processor i). If the processing load becomes unbalanced, repartitioning of the web-space is required. New partitions $W_1', \ldots, W_k'$ are formed, and $W_k'$ is mapped to processor i, then for each i and j, processor i sends the URLs in $W_i \cap W_j'$—currently located in its queue—to processor j. Similarly, processor j sends the URLs in $W_j \cap W_i'$ to processor i.

Figure 6:
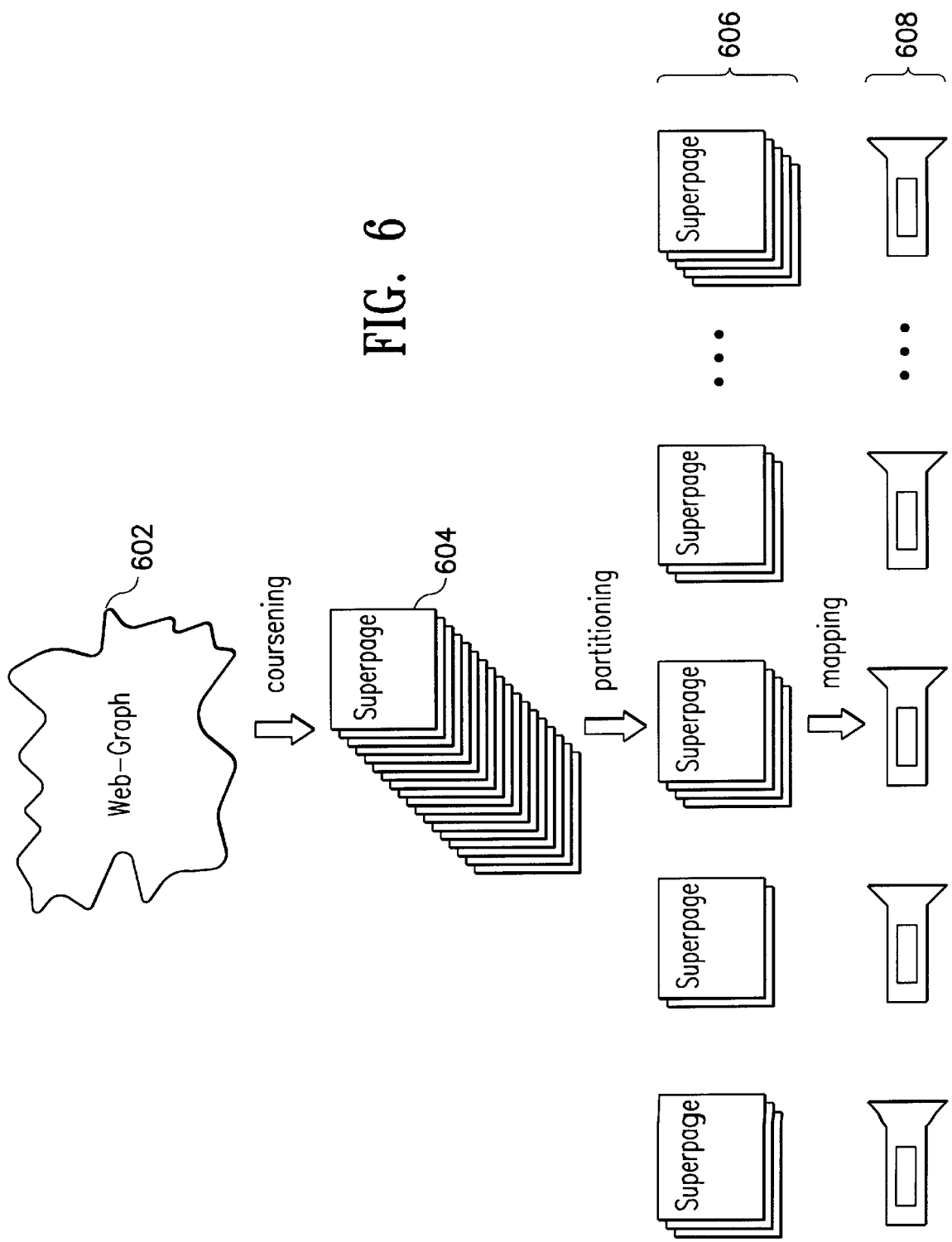
FIG. 6 is a flowchart showing the concept of coarsening and partitioning as used in one embodiment of the present invention.

However, because the entire web-graph is not known during the time partition nor repartition occur, graph coarsening may be applied in one embodiment as shown in FIG. 6. Graph coarsening may be required because it is almost impossible to design a partition at the URL level without knowing the web-graph formation at the partitioning time.

FIG. 6 shows an intermediate structure called a superpage 604 of URLs to generate a coarsened image of a web-graph 602. The superpage 604 is a set of URLs that are "close" to each other according to the respective URL hierarchy. A set of superpages may be formed dynamically in the gathering/crawling phase. A partition 606 then is a division of super-pages 604 into k sets of URLs.

For example, the web-graph 602 of FIG. 6 may be divided into a collection of superpages 604 $P_1, \ldots, P_m$, where m is usually much larger than k, the number processors 608. From the original web-graph 602 W=(U,L), a new graph C={P,S} may be constructed where P={$P_1, \ldots, P_m$}, a set of superpages, and S={$S_{i,j}$:1≦I, j≦m} where $S_{i,j}$ is a set of hyperlinks from $P_i$ and $P_j$. $S_{i,j}$ will be referred to as a super-hyperlink from superpage $P_i$ to $P_j$. A weight w(Pi) of each superpage $P_i$ is equal to the number of URLs in $P_i$. In other words, C is a coarsened graph of the original web-graph 602 W.

The basic idea for the dynamic load balancing is to define/create superpages from a URL hierarchy, estimate the weight of a superpage by the number of URLs crawled or in the queue, and estimate the number of super-hyperlink similarities. The web-graph is then partitioned by partitioning the coarsened graph C over superpages. This allows quick decisions concerning which URL belongs to which partition once a partition is formed by first determining the superpage containing the URL by the URL-tree and then returning the partition number of the superpage.

a. Structure and the Definition

Given a URL, a sequence of tokens can be defined from its domain name and its URI. Tokens from a domain name are ordered from right to left, while the tokens for the URI are ordered from left to right. For example, gcs.almaden.ibm.com/docs/Slides/Tspaces/index.htm defines the sequence: (com, ibm, almaden, gcs, docs, Slides, Tspaces, index.htm). Following this sequence of tokens, we can reach to a leaf of this URL in the URL-tree can be accessed.

Figure 7:
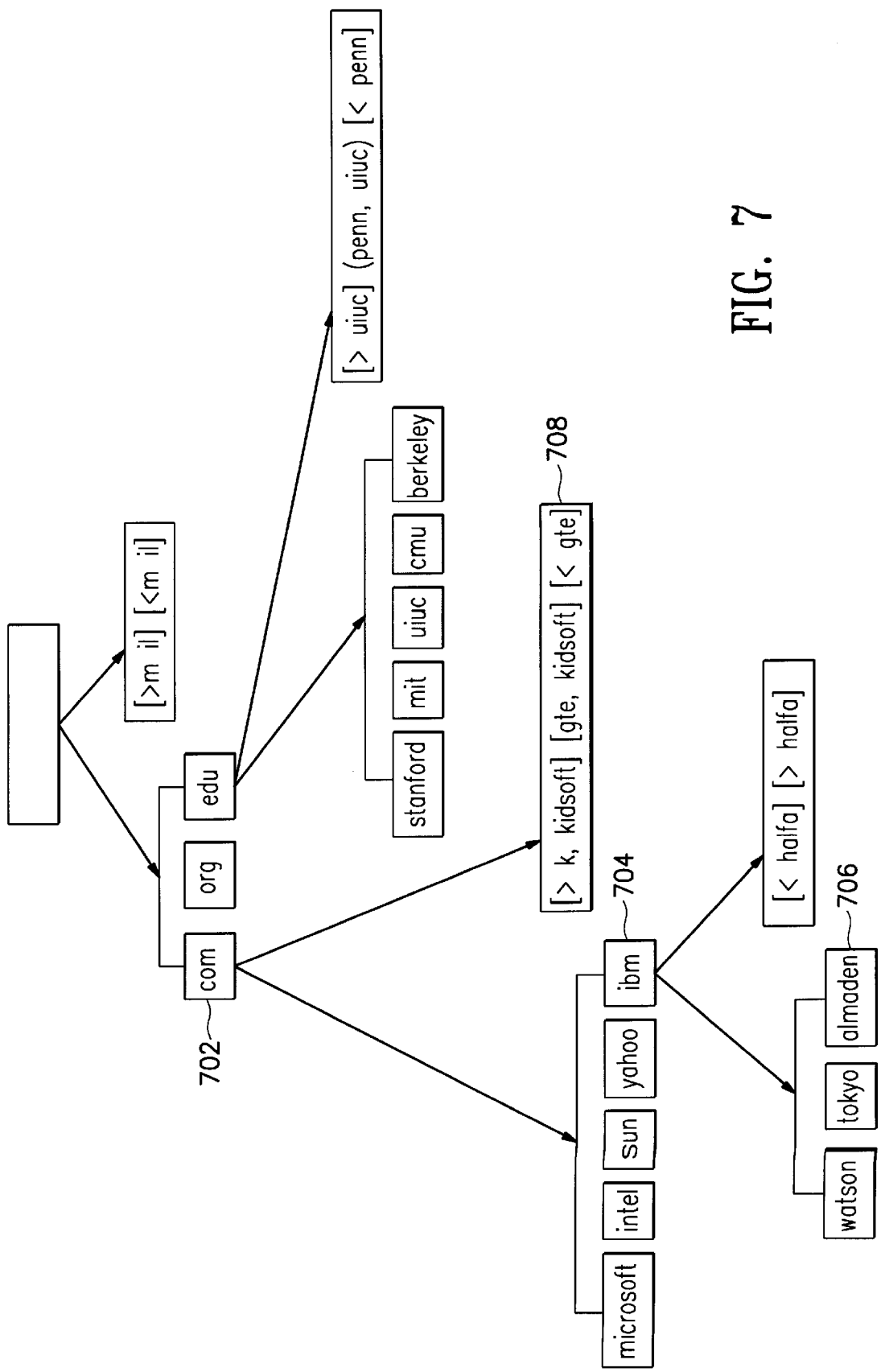
FIG. 7 is a URL-tree illustrating physical and hyperlink locality between URL's in a url-tree.

A superpage may be defined as shown in FIG. 7 as a "frontier" of the URL-tree when the tree is "expanded" from the root. For example, imagine initially only one superpage, a root 702 of the URL-tree. The frontier of the URL-tree is just the root. Any node of the tree may be expanded either by singletons or by intervals. For example, suppose a root 702 is com. A singleton containing ibm 704 defines an expansion of the root, that is, a child of the root 702 whose token is ibm 704. Similarly, a singleton expansion of ibm 704 can be made with almaden 706 as the token.

In an interval expansion, a sequence of ordered strings such as string 708 can be designated and the children of the node of the tree can be divided into intervals. For example, for the root com 702, string (N., Kidsoft, H, creativelabs) can be used to divide the children of the root into intervals whose next token is in [N or larger], [Kidsoft, N), [H, Kidsoft) [creativelabs, H), [smaller than creativelabs], respectively. Or, as shown in FIG. 5, the string may comprise the interval [>kidsoft][gte,kidsoft][<gte] or any other string that defines the desired expansion.

A singleton expansion extends URL trees, and interval expansion clusters the children of a node in the frontier of a tree. In one embodiment, an interval is not extended beyond a level where the interval will always be a leaf of the tree. Once an expansion has occurred, the node at the frontier is used as the superpage.

In team crawling, a user provides an initial expansion. One method of the present invention automatically generates an initial partition from this initial expansion. Once gathering/crawling starts, each processor may maintain some statistical information in the partial URL-tree that is currently used for defining superpages. This statistical information may include a set of tokens in each node which are not currently used in the singleton expansion, but which may be the candidates a next-round singleton expansion. A random sample of all the interval visits of a node may also be maintained, and may be used for re-defining an interval expansion of the node. In addition, number of visits to each internal nodes of the current partial URL-tree may be recorded and used to estimate the "weight" of each new and old superpage. As discussed above, this weighing may be used for load balancing.

Given this information and a selected threshold for a superpage information size, a set of new superpages may be generated by proper singleton and interval expansion as discussed immediately below.

b. Superpage Partitioning

Using superpages in the present invention permits an addressable structure to be established over the web-graph, where every URL has a superpage "number" or address. Even though the precise number of URLs in a superpage may not be known, or how a superpage is connected with other superpages, information gathered can be used to estimate these measures during the processing of crawling/gathering. Further, superpages can be used to reduce the partition problem of a large scale unknown graph to a partition problem of a reasonable sized known graph as shown below. Superpages may be mapped onto processors to balance/rebalance a processing load, and to optimize a match between processors and superpages.

During the crawling/gathering, each processor obtains and maintains some statistical information on the average access time and processing time of a URL page from a superpage. In one embodiment, these two pieces of time are combined into a single parameter hereafter referred to as a processing rate. Hence, for m superpages and k processors, the processing rate of information can be viewed as a k by m table R=[$r_{ij}$] where $r_{ij}$ is the rate that processor i can access/process URL pages in superpage j.

In addition, all processors in one embodiment may collaboratively bookkeep the number of URLS visited in each superpage and to be visited in each superpage, and may, also maintain the size of super-hyperlink among these superpages. In the partition phase, an array w=[$w_i$] may be obtained where $w_i$ is the number of URLS visited at a given time that belong to superpage i, and S=[$S_{i,j}$] where $S_{i,j}$ is a super-hyperlink from superpage i and superpage j.

G. Dynamic Load Balancing

This section, discusses how to dynamically create superpages as well as various methods used to partition superpages.

As discussed above, given an expansion of the URL-tree, a set of superpages may be defined from the frontier of the expansion. These superpages may be partitioned and distributed across gatherers/crawlers (processors). Each Gatherer processor initially "sees" the same expansion and the same set of superpages.

Each Gatherer then runs a method described below. When it encounters a new URL—one that it did not initially see—it first checks with the current expansion of the URL-tree to determine the superpage that contains the URL. It locates the partition that contains the superpage. If the superpage is local to the Gatherer itself, it checks with the already—visited pool to decide whether this URL has been processed. If not, the new URL will be added to its local queue. If the URL belongs to a superpage which is mapped to some other processor, the Gatherer forwards it to the proper processor (in one embodiment, by posting it to the Tspaces). Every Gatherer has an observer thread to receive the URLs sent from other gatherers and to insert them in its local URL queue if appropriate.

When a URL is pushed down the current expansion of the URL-tree, a set of statistical data stored at each node of the tree is updated. This data may be used for further load balancing.

1. Hot Token and Sample Tokens

Whenever a URL passes through a node in the URL-tree, the number-of-visits counter for the node is increased. Each Gatherer only updates their own copy of the expansion. But, if those numbers are added together among all copies of the expansion, the number of URLs that belong to the subtree of a node in the expansion can be obtained.

To assist dynamic load balancing, two other pieces of information may be maintained at each node in the expansion: hot tokens and sample tokens. When a URL reaches a node in the expansion tree, its next token in the token sequence of the URL name is examined. If the next token matches to a token of the singleton children expansion, it is pushed down to the next level of the expansion tree and the number-of-visits counter is increased. The unmatched tokens are divided into two classes: hot tokens and cool tokens. A hot token hash may be maintained to bookkeep a list of 50–200 of the most often used unmatched tokens and their counters. An unmatched token not in this hash is called a cool token, and a random sample of unmatched tokens may be maintained.

2. Dynamic superpage creation

Dynamic load balancing may be triggered in the present invention in one or more of the following circumstances: a processor is too idle; a new processor joins the crawling team; a processor decides to quit the crawling team; or the physical locality is poorly achieved in the partition. Other events specified by the user may singularly or collectively trigger balancing also.

Once load re-balancing is to be performed, the gatherers use the Tspaces to reach a consensus and select a "leader" processor to perform the repartition. Every other processor used for gathering will send their copies of the expansion tree to the leader processor (leader). The leader will merge the information collected at each node in the expansion tree. The resulting copy of the expansion tree will maintain all the statistical data about each superpage as well as about each internal node in the expansion tree such as the number-of-visits counter, the set of hot tokens, and the set of sample tokens.

In one embodiment, the leader will run the following superpage creation method at each node of the expansion. In this method, where k is the number of processors and $\delta$ is a parameter that determines a threshold of the size of the information superpages and typically 20 or more, and W is the number-of-visits to the root of the expansion tree, then W is equal to the number of URLs that have been processed or put in the queue. This method yields an estimation of the total weight of the superpage, where $\Delta = W/(k\delta)$.

Method Superpage Creation ($\Delta$)

If there is a hot token whose count of visits is at least $\Delta$, perform a singleton expansion with that token. The weight of the singleton expansion is equal to its number-of-visits count;

Resample the remaining hot tokens into the cool token samples;

Let I be the ratio of the total number of cool-token visits to that of $\Delta$. I will be the number of interval expansions created; and Choose I evenly spaced tokens in the cool-token-samples and create I interval expansions.

The application of the above Superpage Creation method is applied to every node in the expansion tree and generates a new frontier to the expansion tree that is used to define the new superpage for the next round of gathering/crawling.

3. Superpage Partitioning Methods

In order to optimize physical locality between URLs, the access rate of each processor to the severs in each superpage needs to be determined. During the crawling, each processor maintains a vector of this average access rate to each sever or a group of severs in the same superpage. These data will be sent to the leader to assemble the access/process rate table R mentioned in Section G.2.

In one embodiment, partitioning is performed where, given a collection of m superpages $\{P_1, P_2, \ldots, P_m\}$, with weights $\{w_1, w_2, \ldots, w_m\}$, and k processors whose access rates to the superpages are given in table R, dividing the superpage into k subsets $U_1, \ldots, U_k$ that minimizes $$\max_i^k T_i$$

where $$T_i = \sum_{P_j \in U_i} w_j / r_{i,j}$$

In other words, the version will find a partition that not only balances the work load of each processor, but also optimizes the match between the superpages and processors by trying to assign each superpage to a processor which has the most efficient processing rate.

Method Superpage Partition I

Sort the superpage in an non-increasing order by their weights, where $w_1 \geq w_2 \geq w_m$;

Let $T_i=0$ and $U_i=\emptyset$ for all $1 \leq i \leq k$;

for (j=1; j$\leq$m; j++),

Let $\Delta_i = w_j/r_{i,j}$ for i in the range $1 \leq i \leq k$.

Add $P_j$ to $U_s$ with the s that has the smallest $T_s + \Delta_s$, and let $T_s = T_s + \Delta_s$; and Return $U_1, U_2, \ldots, U_k$.

The above partition may be improved by one local improvement method by reducing $\max_i T_i$ by moving a superpage from the $U_s$ with the maximum $T_s$ to some other set. Other local improvement procedures, readily apparent to those skilled in the art after reading this specification, may also be implemented.

In this version of the partition method, the amount of crossing hyperlinks among superpages in different partitions was not included as a quality measurement.

In another embodiment, the communication overhead of super-hyperlink across partition may be a primary concern, where C is a table of rates where table $c=[c_i]$, and $c_i$ is the rate for communicating (sending and receiving) of URLs to other processors. In this case, partitioning may comprise given a collection of m superpages $\{P_1, P_2, \ldots, P_m\}$, with weights $\{w_1, w_2, \ldots, w_m\}$, and super-hyperlinks S, and k processors whose access rates to the superpages are given in table R, and whose communication rates are given in table c, dividing the superpage into k subsets $U_1, \ldots, U_k$ that minimizes $$\max_i^k T_i$$

where $$T_i = \sum_{P_j \in U_i} (w_j/r_{i,j} + B_i/c_i)$$

where $B_i$ is the number of hyperlinks that are to or from superpages in $U_i$ that are not in $U_i$ itself. In other words, this version finds a partition that not only balances the work load of each processor and minimizes the communication overhead, but also optimizes the match between the superpages and processors by trying to assign each superpage to a processor that has the preferred processing rate. In most cases, the preferred processing rate is the fastest processing rate. This version of the partitioning method is shown below.

Method Superpage Partition II

Sort the superpage in an non-increasing order of their weights, where $w_1 \geq w_2 \geq \ldots w_m$;

Let $T_i=0$ and $U_i=\emptyset$ for all $1 \leq i \leq k$;

for (j=1; j$\leq$m; j++),

Adding $P_j$ to $U_i$ may increase the time for all processors, including $T_i$, where an increase on $T_h$ is $\Delta_{i,h}$.

Add $P_j$ to $U_s$ with the s that has the smallest $\max_h T_h + \Delta_{s,h}$, where $T_h = T_h + \Delta_{s,h}$; and Return $U_1, U_2 \ldots, U_k$.

As indicated with respect to the earlier embodiment of the partitioning method, the partition method above may be further improved by implementing various local improvement procedures.

H. Hot Pages

A web-graph is generally highly irregular and highly connected. Many pages have very large in- and out-degrees, and there may be many densely connected and bi-connected "communities" of pages.

In one embodiment, the present invention dynamically recognizes these special pages, substructures, and highly connected communities, and improves the quality of partitioning and reduces the amount of communication required for distributed crawling.

To better understand this embodiment, an examination of the earlier discussed implementation of sequential crawling is required. In crawling, two structures are maintained: a hit-hash of those URLs that have already been visited, and a queue of those URLs whose parents have been visited. When a new URL is obtained, the method checks whether the new URL has already been visited. If it has been, then the URL is dropped, otherwise, it is inserted into the queue. Preferably, before it is inserted into the queue, the URL is checked as to whether it has already been put into the queue at a previous stage. The queue grows faster than the hit-hash. In fact, it may grow too fast to be reasonably stored in the memory. If this is true, then the queue is maintained in storage, and only a window of the queue remains in memory.

Because the queue may grow so quickly, the queue may become too large for quick indexing and checking, thereby requiring expensive out-of-core computation, because the earlier embodiment inserts the URL at the end of the queue. The result is that there may exist more than one copy of a URL in the queue. For example, if a page has M in-links, it could show up in the queue M times.

In distributed crawling, this problem of checking which URL has been processed and queued becomes enormous. To overcome this problem, in one embodiment, the invention requires each processor to maintain its own hit-hash and queue for its respective partition. If a URL belongs to some other processor's partition, it is posted on the Tspaces. The processor that extracts the posted URL from Tspaces checks with its own hit-hash and its queue.

If a URL is linked to by M URLs from sub-domains other than the sub-domain that contains the URL, then it will be sent to Tspaces M times.

In an alternative embodiment, each processor is required to maintain a communication queue, c-queue, for those URLs to be sent to Tspaces, and a communication hit-hash, c-hit-hash, for those URLs that have been posted. Before posting a URL to Tspaces, the processor will check whether it is already in the c-hit-hash or c-queue. This reduces the load of Tspaces.

In a preferred embodiment, the present invention solves this queue problem using hot-pages. Each Gatherer processor maintains an in-core hash that only stores hot-pages, that is, those URLs that have a potentially large in-degree. When the processor encounters a new URL, it checks the URL against a hot-page-hash. A dynamic mechanism is implemented to determine hot pages, and to keep the hot-page-hash information small, assuring that it can be stored in the memory.

I. Team Crawling Including Light-weight Helpers

In many organizations, there are a large collection of digital signal processing machines (machine) that will be idle during certain periods of time, e.g., at night. These systems may be used in one embodiment of the present invention for team crawling.

Figure 8:
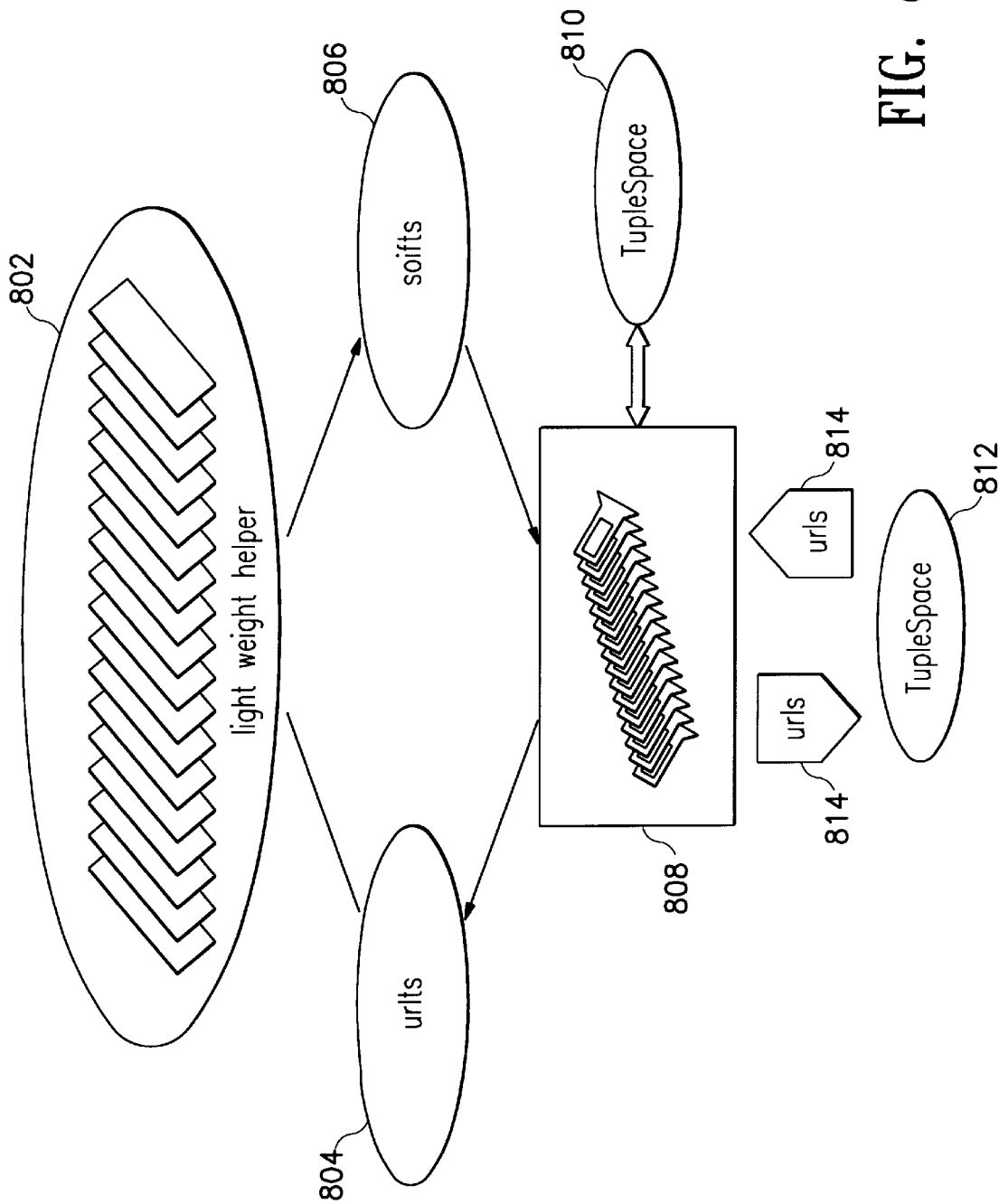
FIG. 8 is a flow diagram showing the implementation of lightweight crawlers as used in accordance with one embodiment of the present invention.

In the preferred embodiment, a user of a machine has full rights to decide at what time and for how long he/she would like to contribute the machine for crawling. This version of the invention does not store information on their local disks. As such, these machines are referred to as light-weight digital signal processing machines for crawling. Further, when these machines are used for crawling, dynamical load balancing is not performed each time a light-weight machine joins or withdraws from the crawling team. FIG. 8 helps to illustrate this architecture.

As shown in FIG. 8, this embodiment of the invention may include a team of "regular" distributed crawlers. A crawler is such as that discussed above, and is not a lightweight crawler. As above, they are coordinated by their own Tspaces domains for crossing hyperlinks and for partition coordination. However, this embodiment uses two Tspaces domains, urlTS 804 and soifTS 806, for communicating with light-weight machines 802. The Tspaces domain urlTS 804 is for URLs and soifTS 806 is for summaries. Regular crawlers 808 can send URLs from its queue to urlTS 804 for light-weight machines. The light weight machines that join crawling retrieve URLs from urlTS 804, gather the pages, generate summaries for these pages, and send the summaries to soifTS 806. The regular crawlers 808 then retrieve their own summaries from soifTS 806, extract a set of hyperlinks from the SOIFs, and process them using Tspaces 810 and 812. In this method, the light-weight machines are used only as occasional helpers. Load balancing may be performed between regular crawlers 808 as described above.

Signal-Bearing Media

Such a method may be implemented, for example, by operating a system 1000 (shown in FIG. 10) to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to gather information using collaborative team crawling.

Figure 9:
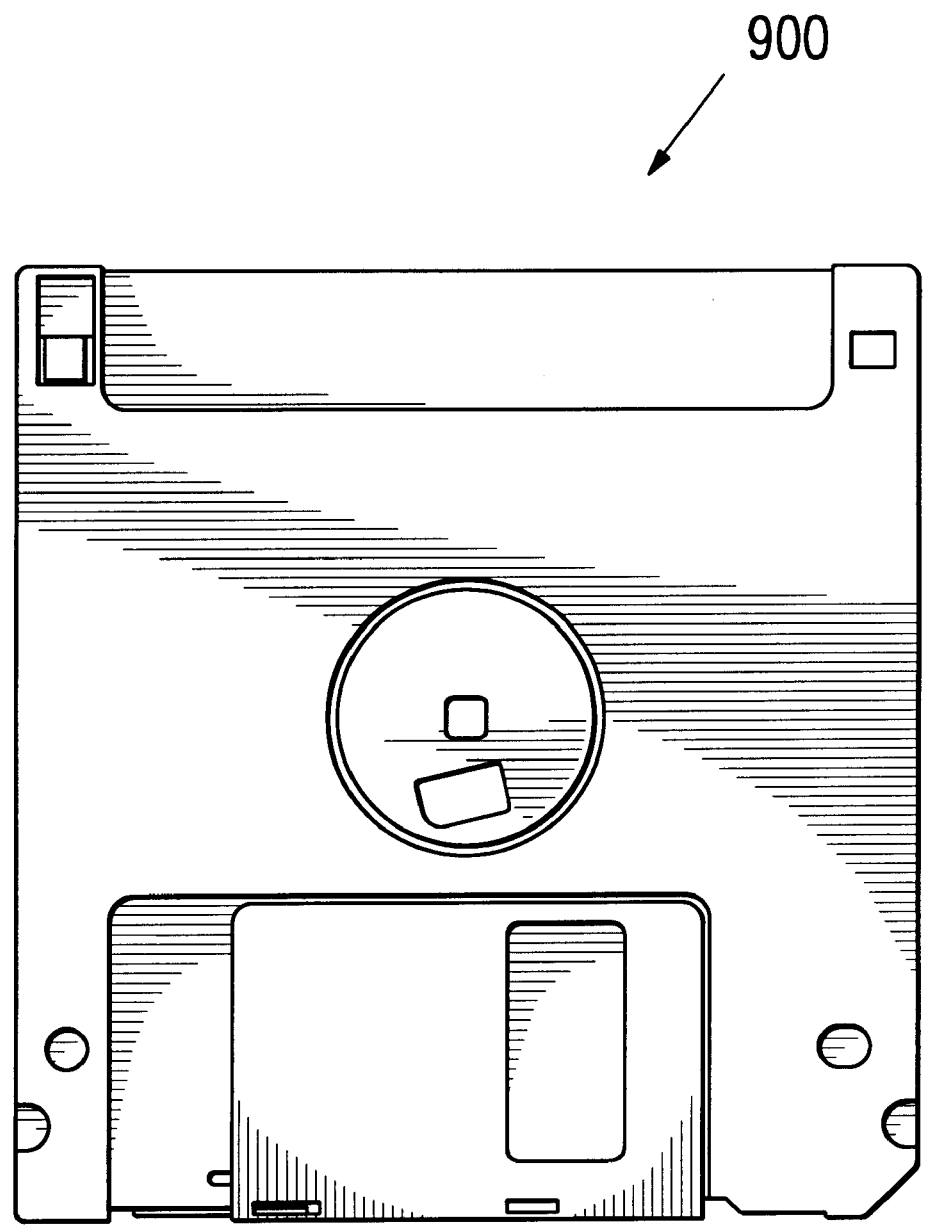
FIG. 9 is a perspective view of an exemplary signal-bearing medium in accordance with the invention.

This signal-bearing media may comprise, for example, RAM (not shown) contained within the system 1000. Alternatively, the instructions may be contained in another signal-bearing media, such as a magnetic data storage diskette 900 (FIG. 9), directly or indirectly accessible by the system 1000. Whether contained in the diskette 900 or elsewhere, the instructions may be stored on a variety of machine-readable data storage media, such as DASD storage (e.g., a conventional "hard drive" or a RAID array), magnetic tape, electronic read-only memory (e.g., ROM, CD-ROM, EPROM, or EEPROM), an optical storage device (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise lines of compiled C, $C^+$ or $C^{++}$ language code.

Hardware Components & Interconnections

Figure 10:
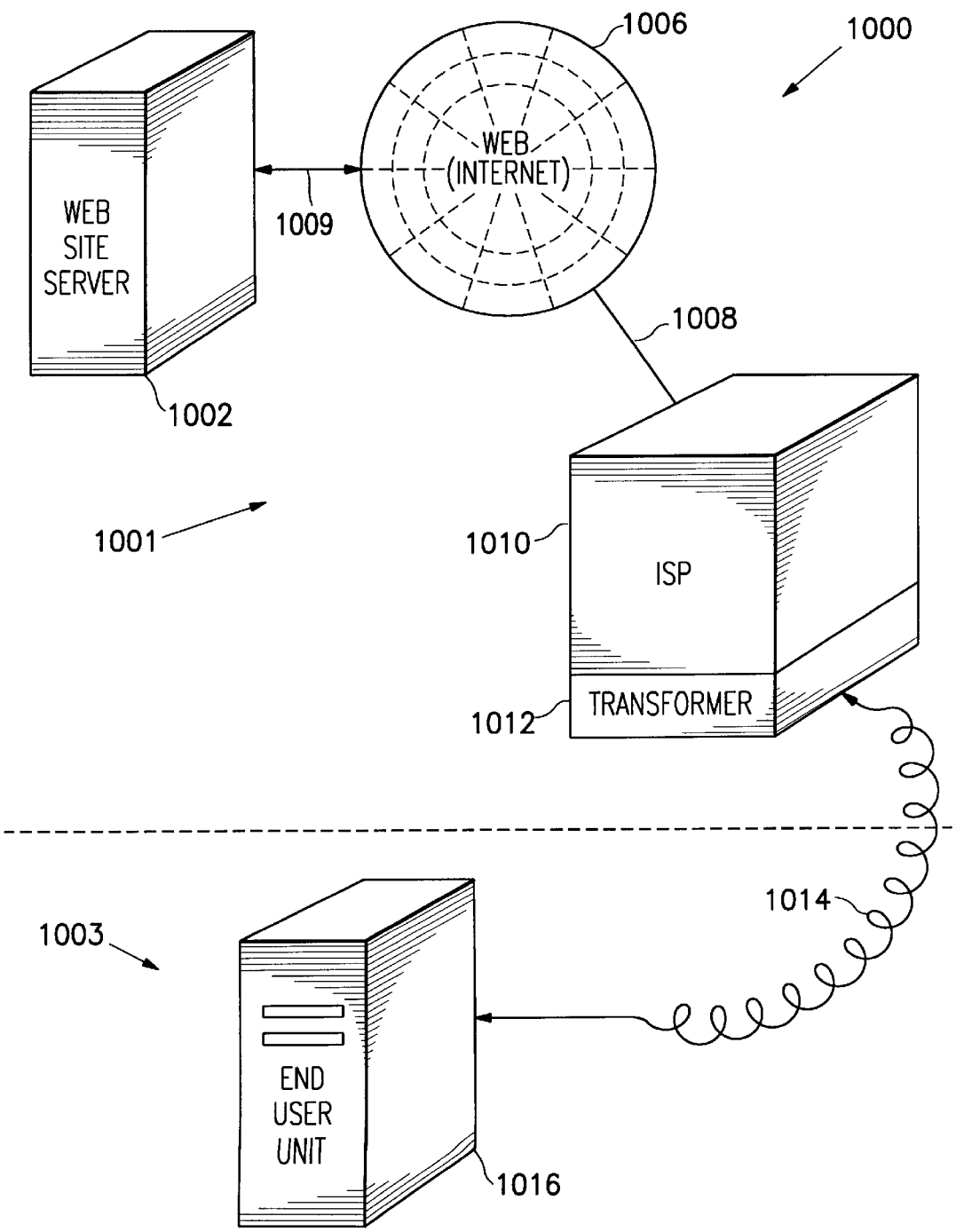
FIG. 10 is a block diagram of the hardware components and interconnections of an apparatus in accordance with the invention.

In addition to the various method embodiments described above, a different aspect of the invention concerns a digital data processing machine for performing the method steps, and which may be embodied by various hardware components and interconnections as described in FIG. 10.

Although the following detailed description of the invention is discussed in relationship to an Internet system 1000 as shown in FIG. 10, such description is not intended to limit the scope of the invention.

In FIG. 10, the Internet system 1000 as shown comprises two parts, a first system 1001 and a second system 1003. The first system 1001 may include a web site server 1002 communicatively connected via a web 1006 to an Internet service provider (ISP) 1010 using fast-link communication channels 1008 and 1009. The server 1002 may act as a host location for media or multimedia objects. In one embodiment, the server 1002 may be a mainframe computer manufactured by the International Business Machines Corporation of Armonk, N.Y., and may use an operating system sold under trademarks such as MRS. Or, the server 1002 may be a Unix computer, or OS/2 server, or Windows NT server or IBM RS/6000 530 workstation with 128 MB of main memory running AIX 3.2.5. The server 1002 may incorporate a database system, such as DB2 or ORACLE, or it may access data on files stored on a data storage medium such as disk, e.g., a 2 GB SCSI 3.5" drive, or tape.

In another embodiment, the web site server 1002 may comprise one or more magnetic data storage disks commonly referred to as direct access storage devices (DASD). As is well known in the art, the objects may be stored by the server 1002 in various formats depending upon the type of media. For example, a multimedia object such as a cartoon figure might be stored in a graphic image format (GIF) and a photograph might be stored in a tagged image format file (TIFF), or a joint photographic expert group (JPEG) format.

The ISP 1010 may be connected to the second system 1003 comprising an end-user unit 1016 via a slow-link channel 1014, where the ISP 1010 controls the passage of information between the web site server 1002 and the end-user unit 1016. "Fast-link" and "slow-link", as mentioned above, refer to the relative speed with which the communication channels 1008 and 1014 can transfer a media object. In any case, the object transfer capabilities of the fast-link channel must exceed those of the slow-link channel, and one or both links may comprise a line, bus, cable, electromagnetic link, microwave, radio signal, or other wireless means for exchanging commands, media objects, and other information and data between the web site server 1002, the ISP 1010, and the end-user unit 1016. If the fast-link channel transfer rate is less than the slow-link transfer rate, no transformation is necessary.

Among other features, the ISP 1010 may include a fire wall used as a means of reducing the risk of unwanted access to the end-user unit 1016. Although the ISP 1010 is pictured as a separate device, the ISP may be integral to the end-user unit 1016. The ISP 1010 may also include a transformer 1012 that may be used to transform an object and set and/or implement transfer parameters to facilitate efficient transfer of objects between the transformer 1012 and the end-user unit 1016. In another embodiment, the ISP 1010 may be eliminated from the system 1000 and the transformer 1012 may be integral to the web site server 1002, or may be included within the second system 1003 rather than the first system 1001 as shown.

The end-user unit 1016 may include a processing unit (not shown), such as a microprocessor or other processing machine, communicatively coupled to a storage unit. The storage unit may include a fast-access memory and may include nonvolatile storage. The fast-access memory preferably comprises random access memory, and may be used to store the programming instructions executed by the processing unit during execution of a computer program. The nonvolatile storage may comprise, for example, one or more magnetic data storage disks such as a "hard drive" or any other suitable storage device. Further, as shown in FIG. 10, the end-user unit 1016 may include in one embodiment an output module 1018 for outputting or displaying program status results on a graphic display 1020, print device 1022 or storage medium 224.

Despite the specific foregoing description, ordinarily skilled artisans (having the benefit of this disclosure) will recognize that the machine discussed above may be implemented in a machine of different construction, without departing from the scope of the invention. As a specific example, the transformer 1012 may be eliminated; furthermore, the ISP 1010 may be provided on-board the end user unit 1016, even though depicted separately in FIG. 10.

Other Embodiments

While there have been shown what are presently considered to be preferred embodiments of the invention, it will be apparent to those skilled in the art that various changes and modifications can be made herein without departing from the scope of the invention as defined by the appended claims.

We claim:

1. A method to gather data objects from an information system, comprising:

constructing logical web-graphs defining logical relationships between specified objects in the information system;

partitioning the web-graph into sub-graphs; and processing the specified objects to locate desired objects by:

balancing the processing of the specified objects by mapping the sub-graphs to one or more preferred processors, wherein a processor is preferred if it reduces processing time or overhead; and re-balancing the processing if the processing load becomes unbalanced.

2. The method recited in claim 1, further comprising pushing the located desired objects to a user desiring the objects.

3. The method recited in claim 1, wherein the web-graph defines a resource identification space containing resource identifications, the resource identification space being a directed graph having a collection of vertices and ordered nodes connecting the vertices, each resource identification defining a vertex of the directed graph.

4. The method recited in claim 3, partitioning the web-graph into sub-graphs comprising:

coarsening the web-graph to create sub-graphs, the sub-graphs comprising identifiable groupings of objects, where coarsening comprises contracting the vertices in the web-graph; and dynamically recognizing each identifiable sub-graph.

5. The method recited in claim 4, further comprising creating sub-graphs comprising clusters of resources having physical closeness to one another.

6. The method recited in claim 5, further comprising creating sub-graphs comprising clusters of resources having hyperlink closeness to one another.

7. The method recited in claim 6, further comprising estimating a weight for each node of a graph, the weight reflecting a number of visits to the node, a cumulative total of the weights for nodes contained in a sub-graph being used for processing (load) balancing.

8. The method recited in claim 7, load balancing including:

maintaining information regarding average access time and processing time of an object or a sub-graph, these access and processing times forming a processing rate;

mapping sub-graphs to desired processors based upon processing rate differences.

9. The method recited in claim 8, further comprising:
identifying communities of sub-graphs that have numerous connections; and
mapping sub-graphs having numerous connections to a same processor.

10. The method recited in claim 9, further comprising using a hierarchically structured namespace having syntactic components to identify objects.

11. The method recited in claim 9, further comprising:
maintaining a queue and a hit-hash for each processor of sub-graphs, the hit-hash maintained for objects having a potentially large in-degree;
checking the processors hit-hash for the object if a new object is encountered by a processor, and processing the object if is the hit-hash, otherwise;
moving the object to a temporary location;
having each another processor check its hit-hash and queue for the object; and
further processing the object.

12. The method recited in claim 9, further comprising using non-preferred (lightweight) processors and preferred processors for processing, wherein a lightweight processor can be removed from processing at any time.

13. The method recited in claim 12, further comprising not re-balancing the processing load between processors when a lightweight processor is added or removed from processing.

14. A signal-bearing medium tangibly embodying a program of machine-readable instructions executable by a digital processing apparatus to perform a method for gathering objects from an information system, said method comprising:
constructing logical web-graphs defining logical relationships between specified objects in the information system;
partitioning the web-graph into sub-graphs; and
processing the specified objects to locate desired objects by:
balancing the processing of the specified objects by mapping the sub-graphs to one or more preferred processors, wherein a processor is preferred if it reduces processing time or overhead; and
re-balancing the processing if the processing load becomes unbalanced.

15. The medium recited in claim 14, the method further comprising pushing the located desired objects to a user desiring the objects.

16. The medium recited in claim 15, wherein the web-graph defines a resource identification space containing resource identifications, the resource identification space being a directed graph having a collection of vertices and ordered nodes connecting the vertices, each resource identification defining a vertex of the directed graph.

17. The medium recited in claim 16, partitioning the web-graph into sub-graphs comprising:
coarsening the web-graph to create sub-graphs, the sub-graphs comprising identifiable groupings of objects, where coarsening comprises contracting the vertices in the web-graph; and
dynamically recognizing each identifiable sub-graph.

18. The medium recited in claim 17, further comprising creating sub-graphs comprising clusters of resources having physical closeness to one another.

19. The medium recited in claim 18, further comprising creating sub-graphs comprising clusters of resources having hyperlink closeness to one another.

20. The medium recited in claim 18, load balancing including:
maintaining information regarding average access time and processing time of an object or a sub-graph, these access and processing times forming a processing rate;
mapping sub-graphs to desired processors based upon processing rate differences.

21. The medium recited in claim 20, further comprising:
identifying communities of sub-graphs that have numerous connections; and
mapping sub-graphs having numerous connections to a same processor.

22. The medium recited in claim 21, further comprising using a hierarchically structured namespace having syntactic components to identify objects.

23. The medium recited in claim 21, further comprising:
maintaining a queue and a hit-hash for each processor of sub-graphs, the hit-hash maintained for objects having a potentially large in-degree;
checking the processors hit-hash for the object if a new object is encountered by a processor, and processing the object if is the hit-hash, otherwise;
moving the object to a temporary location;
having each another processor check its hit-hash and queue for the object; and
further processing the object.

24. The medium recited in claim 21, further comprising using non-preferred (lightweight) processors and preferred processors for processing, wherein a lightweight processor can be removed from processing at any time.

25. The medium recited in claim 24, further comprising not re-balancing the processing load between processors when a lightweight processor is added or removed from processing.

26. The medium recited in claim 17, further comprising estimating a weight for each node of a graph, the weight reflecting a number of visits to the node, a cumulative total of the weights for nodes contained in a sub-graph being used for processing (load) balancing.

27. An apparatus for traversing an information system to retrieve designated objects, the apparatus comprising:
a recognizer to determine a format for each object retrieved;
a summarizer to read varying data formats communicatively coupled to the recognizer;
an expander for expanding objects having a compressed format communicatively coupled to the recognizer and the summarizer;
storage and processors included in one or more of the above, the processors capable of reading digital signals to traverse the information system to retrieve designated objects by:
constructing logical web-graphs defining logical relationships between specified objects in the information system;
partitioning the web-graph into sub-graphs; and
processing the specified objects to locate desired objects by:
balancing the processing of the specified objects by mapping the sub-graphs to one or more preferred processors, wherein a processor is preferred if it reduces processing time or overhead; and
re-balancing the processing if the processing load becomes unbalanced.

28. The apparatus recited in claim 27, further comprising pushing the located desired objects to a user desiring the objects.

29. The apparatus recited in claim 27, wherein the web-graph defines a resource identification space containing resource identifications, the resource identification space being a directed graph having a collection of vertices and ordered nodes connecting the vertices, each resource identification defining a vertex of the directed graph.

30. The apparatus recited in claim 29, partitioning the web-graph into sub-graphs comprising:

coarsening the web-graph to create sub-graphs, the sub-graphs comprising identifiable groupings of objects, where coarsening comprises contracting the vertices in the web-graph; and dynamically recognizing each identifiable sub-graph.

31. The apparatus recited in claim 30, further comprising creating sub-graphs comprising clusters of resources having physical closeness to one another.

32. The apparatus recited in claim 31, further comprising creating sub-graphs comprising clusters of resources having hyperlink closeness to one another.

33. The apparatus recited in claim 32, further comprising estimating a weight for each node of a graph, the weight reflecting a number of visits to the node, a cumulative total of the weights for nodes contained in a sub-graph being used for processing (load) balancing.

34. The apparatus recited in claim 33, load balancing including:

maintaining information regarding average access time and processing time of an object or a sub-graph, these access and processing times forming a processing rate;

mapping sub-graphs to desired processors based upon processing rate differences.

35. The apparatus recited in claim 34, further comprising:

identifying communities of sub-graphs that have numerous connections; and mapping sub-graphs having numerous connections to a same processor.

36. The apparatus recited in claim 35, further comprising using a hierarchically structured namespace having syntactic components to identify objects.

37. The apparatus recited in claim 35, further comprising:

maintaining a queue and a hit-hash for each processor of sub-graphs, the hit-hash maintained for objects having a potentially large in-degree;

checking the processors hit-hash for the object if a new object is encountered by a processor, and processing the object if is the hit-hash, otherwise;

moving the object to a temporary location;

having each another processor check its hit-hash and queue for the object; and further processing the object.

38. The apparatus recited in claim 35, further comprising using non-preferred (lightweight) processors and preferred processors for processing, wherein a lightweight processor can be removed from processing at any time.

39. The apparatus recited in claim 38, further comprising not re-balancing the processing load between processors when a lightweight processor is added or removed from processing.

40. An apparatus for traversing an information system to retrieve designated objects, the apparatus comprising:

a means for recognizing a format for an object retrieved;

a means for summarizing and reading varying data formats communicatively coupled to the recognizing means;

a means for expanding objects having a compressed format and communicatively coupled to the recognizing means and the summarizing means;

storage means and processor means included in one or more of the above, the storage means for storing digital signals, the processor means for reading digital signals and traversing the information system to retrieve designated objects by:

constructing logical web-graphs defining logical relationships between specified objects in the information system;

partitioning the web-graph into sub-graphs; and processing the specified objects to locate desired objects by:

balancing the processing of the specified objects by mapping the sub-graphs to one or more preferred processors, wherein a processor is preferred if it reduces processing time or overhead; and re-balancing the processing if the processing load becomes unbalanced.

41. The apparatus recited in claim 40, further comprising a means for pushing the located desired objects to a user desiring the objects.

42. The apparatus recited in claim 40, wherein the web-graph defines a resource identification space containing resource identifications, the resource identification space being a directed graph having a collection of vertices and ordered nodes connecting the vertices, each resource identification defining a vertex of the directed graph.

43. The apparatus recited in claim 42, partitioning the web-graph into sub-graphs comprising:

a means for coarsening the web-graph to create sub-graphs, the sub-graphs comprising identifiable groupings of objects, where coarsening comprises contracting the vertices in the web-graph; and a means for dynamically recognizing each identifiable sub-graph.

* * * * *